(12) United States Patent
DeCamp (10) Patent No.: US 6,620,373 B2
(45) Date of Patent: Sep. 16, 2003

(54) CUTTING TORCH GUIDE

(76) Inventor: Gene C. DeCamp, P.O. Box 1226, Ellensburg, WA (US) 98926

( * ) Notice: Subject to any disclaimer, the term of this patent is extended or adjusted under 35 U.S.C. 154(b) by 30 days.

(21) Appl. No.: 09/978,471

(22) Filed: Oct. 15, 2001

(65) Prior Publication Data

US 2003/0071398 A1 Apr. 17, 2003

(51) Int. Cl.⁷ .................................................. B23K 7/10
(52) U.S. Cl. ........................................ 266/77; 266/48
(58) Field of Search ........................... 266/48, 66, 76, 266/77

(56) References Cited

U.S. PATENT DOCUMENTS

| | | | |
|---|---|---|---|
| 1,704,473 A | | 3/1929 | Greene |
| D121,091 S | * | 6/1940 | Gebig .......................... 266/76 |
| 2,281,814 A | | 5/1942 | Willoughby |
| 2,341,751 A | | 2/1944 | Willoughby |
| 2,747,856 A | | 5/1956 | Burdwood |
| 3,139,471 A | | 6/1964 | Root |
| 3,734,477 A | | 5/1973 | Enfantino |
| 4,273,313 A | | 6/1981 | DeNardo |
| 4,283,044 A | | 8/1981 | McKibbin et al. |
| 4,391,433 A | | 7/1983 | Doan |
| 4,405,117 A | | 9/1983 | Ohlaug |
| 4,411,411 A | | 10/1983 | Barthelmess |
| 4,549,725 A | | 10/1985 | Carroll |
| 4,575,051 A | * | 3/1986 | Kuper .......................... 266/66 |
| 4,579,318 A | * | 4/1986 | Keedy .......................... 266/66 |
| 4,688,770 A | | 8/1987 | Keedy |
| 6,103,183 A | | 8/2000 | Brown |

* cited by examiner

Primary Examiner—Scott Kastler
(74) Attorney, Agent, or Firm—Wells St. John P.S.

(57) ABSTRACT

A cutting torch guide is described in which a block is formed with a torch tip stop flange that defines a torch tip abutment plane and that is shaped to abut with and angularly position a torch tip with respect to a workpiece plane. An angle iron edge receiving and guiding surface is formed in the block and defines a guide plane that intersects the torch tip abutment plane. The guide plane and torch tip abutment plane are oriented to angularly position a cutting torch tip at an acute angle with respect to the workpiece.

18 Claims, 6 Drawing Sheets

CUTTING TORCH GUIDE

CROSS REFERENCE TO RELATED APPLICATION

This application is an originally filed U.S. patent application and has no relation to other U.S. or foreign filed applications, provisional patents, patents or invention registrations.

TECHNICAL FIELD

The present invention relates to guiding cutting torches to permit accurate cutting operation for gas or plasma cutting torches.

BACKGROUND OF THE INVENTION

It is a challenge for even skilled craft workers to accurately and consistently operate a cutting torch by hand. Hand held cutting torches should be held at a desired angle to the work piece to encourage pre-heating of the workpiece. This angle should be maintained in a plane that is perpendicular to the workpiece surface. Further, it is difficult to maintain the desired angle and follow a prescribed cutting line at the same time. Even the very experienced worker will usually produce an uneven cut that will require time consuming grinding or other finish work.

It is also a challenge to consistently maintain a cutting torch tip at a consistent desired height from the workpiece surface. If the torch is too close to the workpiece, sputtering and torch "popping" can occur, creating a form of slag or spattered metal on the workpiece that usually must be removed by grinding. If the torch is too far from the workpiece, spattering may also occur, or the cut may not adequately penetrate the workpiece. Thus, torch height is another consideration along with torch angle and movement control that adds to the frustration often experienced by those attempting to use a cutting torch by hand.

The above problem has been recognized to a limited degree by others who have developed various forms of cutting torch guides. Many known forms of torch attachments of guides have one or more surfaces that can be moved against a guide surface, but which will allow substantial opportunity for misalignment or spacing with respect to the workpiece. Such attachments have various drawbacks, but primarily simply fail to hold the cutting torch with repeatable accuracy in substantially all the above identified angular and spatial attitudes with respect to a workpiece.

BRIEF DESCRIPTION OF THE DRAWINGS

Preferred embodiments of the invention are described below with reference to the following accompanying drawings.

FIG. 9 is an enlarged end view of a guide in place on an angle iron.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Before describing details of preferred elements, brief descriptions will be given of general aspects of the invention with reference being made to the examples illustrated in the drawings and in which reference numerals refer to various preferred elements.

It is intended that the preferred forms of the present guide be used (without requiring adjustment), with numerous brands and forms of hand held metal cutting torches that are commercially available. It is also preferable that forms of the present guide make use of standard "angle iron" for straight edge reference, to facilitate straight line cutting, and to hold the guide and a torch mounted thereto at a prescribed angle and height from the workpiece surface.

In preferred forms, 1.5 inch by 0.25 inch angle iron may be used. This is a commonly available size and is generally available in most metal working shops where cutting torches are used. The present guide may thus be configured primarily for use with this standard size angle iron. However, it should be noted that the guide may be made to function as well with other angle iron sizes without departing from the spirit and scope of my invention.

In a first aspect of my invention, a cutting torch guide 10 is provided, comprising a block 12 having a top surface 14, a bottom surface 16 and opposed end surfaces 18, 20. A torch tip receiving and mounting surface 22 extends through the block 12 from the top surface 14 through the bottom surface 16 and defines a cutting tip axis X. An angle iron side receiving and guiding surface 24 is formed in the block 12 between the opposed end surfaces 18, 20 and which is at least substantially parallel to the cutting tip axis X. An angle iron edge receiving and guiding surface 26 is formed in the block 12 adjacent the angle iron side receiving and guiding surface 24.

Another aspect includes a cutting torch guide 10 comprising a block 12 with bottom surface 16. A torch tip stop surface 28 is provided on the block 12, defining a torch tip abutment plane H and shaped to abut with and angularly position a torch tip T with respect to a workpiece plane P. An angle iron edge receiving and guiding surface 26 is formed in the block and defines a guide plane G that intersects the torch tip abutment plane H. The guide plane G and torch tip abutment plane H are oriented to angularly position a cutting torch tip T at an acute angle with respect to the workpiece plane P.

Figure 1:
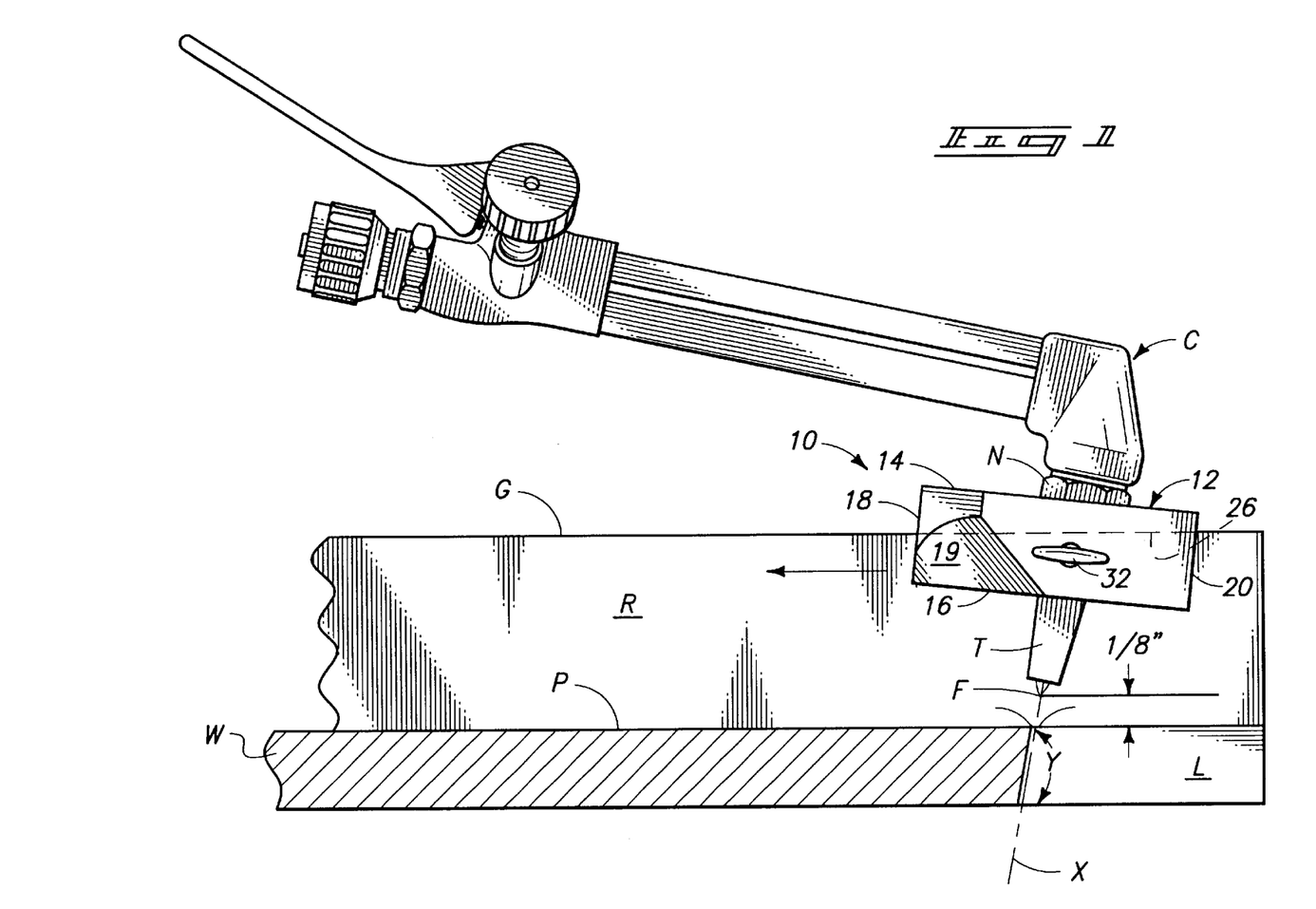
FIG. 1 is a side elevation operational view of a preferred form of the present cutting torch guide in relation to a cutting torch, a guide, and a workpiece.
Figure 2:
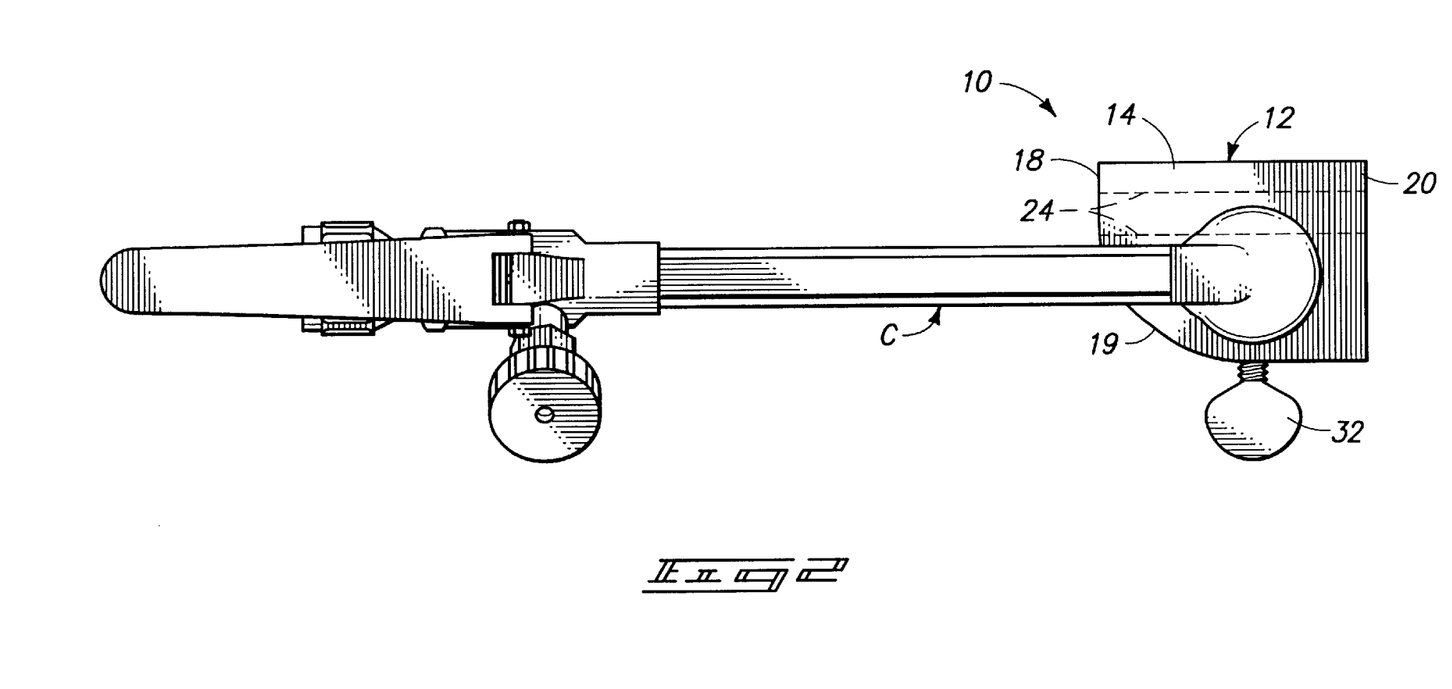
FIG. 2 is a plan view of the exemplary arrangement illustrated in FIG. 1.

Referring now in greater detail to the embodiments illustrated in the drawings, reference will first be made to FIG. 1 in which a cutting torch C of conventional form is shown mounted to a preferred form of the present guide 10 for guided motion over a workpiece W, and along a guide surface which in the embodiment shown, is a commercially available angle iron R. The present guide 10 is used to situate the cutting torch in such a manner that the torch tip T is situated at a preferred cutting angle and distance from the workpiece W, The angle and distance may be maintained as the torch is moved along a cutting line L that may be fairly defined by the angle iron R.

It is preferred in the practice of accurate cutting torch use, that the torch tip be situated above the workpiece by a distance such that the preheating flame tip F is spaced above the workpiece plane P by a distance of approximately ⅛ inch. The present guide may be provided to accomplish such spacing. Further, it is preferred that the torch tip be angled with respect to the workpiece plane P so the preheating flame tip F and flame are advantageously positioned to produce a clean cut with minimal spatter or slag.

It is also preferred that torch tip T be maintained at the desired angle and the preheating flame tip F at the desired distance from the workpiece W while moving along a prescribed line. Both functions are capable through use of the present guide 10.

It is generally preferable to provide the present guide 10 in the form of a solid block of metal, preferably steel. The block may be formed by casting, machining, or by other processes in the configuration shown. It should be understood however that other shapes could be used as well. In fact, the substantially geometric configuration could be eliminated in favor of any other curvilinear, rectilinear or combination of the two. It is sufficient that the appropriate torch tip receiver 22 and the angle iron side and edge receiving surfaces (24, 26) all be oriented in such a manner to allow a cutting torch tip to be held at a desired height and angle from a workpiece surface.

The torch tip receiving and mounting surface 22 may be provided integrally, as the top surface of the block 12, if such surface is machined or otherwise provided at a desired angle to function also as the stop surface 28. However, in the illustrated embodiments, the stop surface 28 is typically set into or otherwise recessed into the block.

Figure 3:
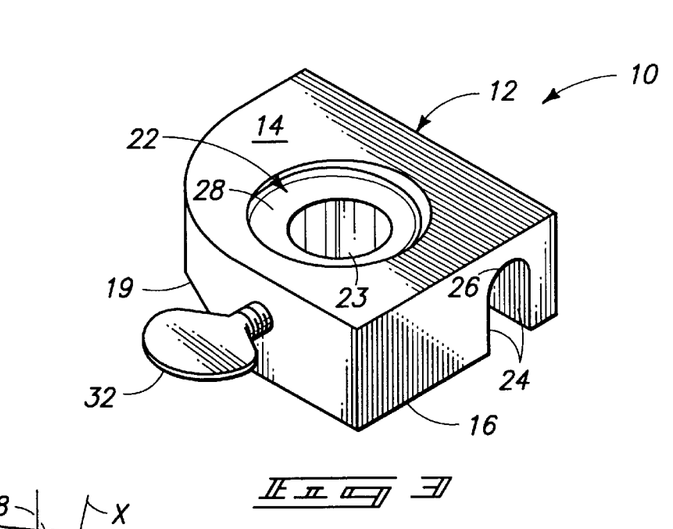
FIG. 3 is a perspective view of the preferred cutting torch guide illustrated in FIGS. 1 and 2.
Figure 5:
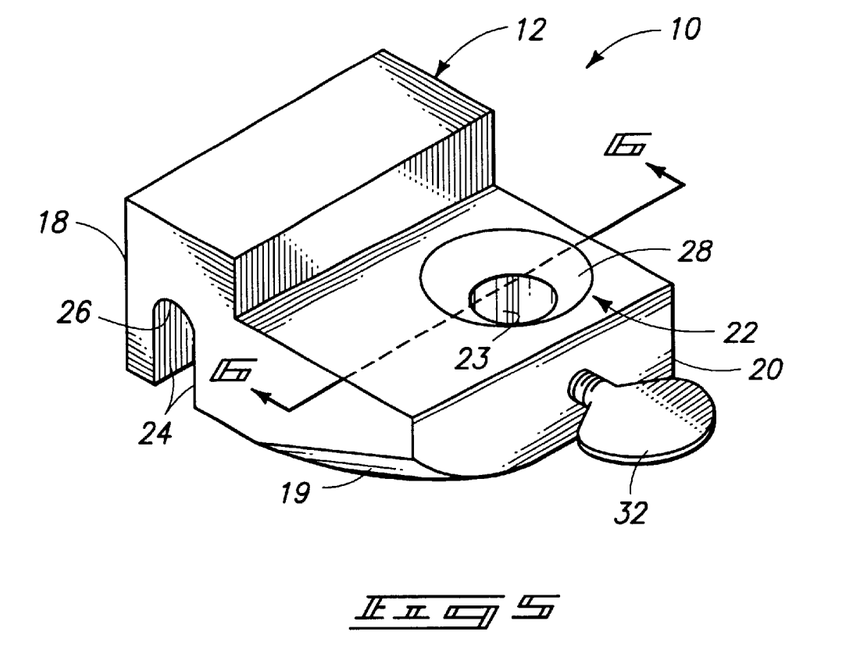
FIG. 5 is a perspective view of the cutting torch guide in a slightly different form than that illustrated in FIGS. 1–4.
Figure 6:
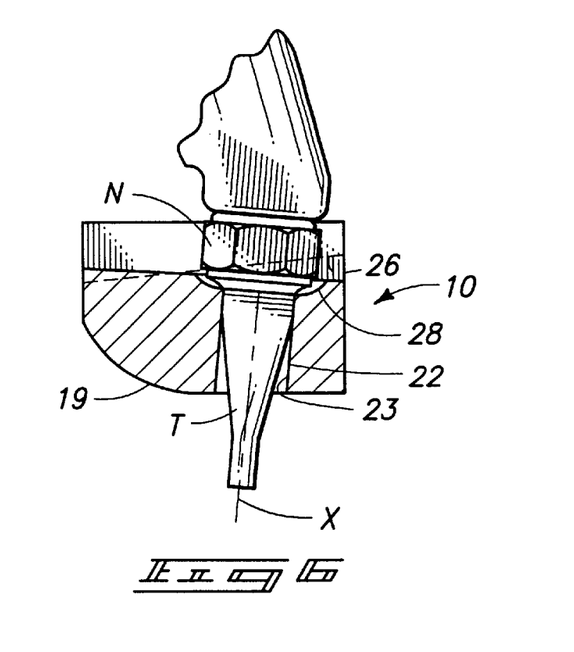
FIG. 6 is a side elevation view of the guide form illustrated in FIG. 5.

The surface 28 is provided to engage or abut with the typical torch tip nut N. The stop surface 28, as shown in the embodiment illustrated by FIG. 3, is simply formed as a flat recessed surface, defining a torch tip abutment plane H (FIG. 4) that is preferably oriented at an angle B, as graphically illustrated in FIG. 4. On the other hand, FIG. 5 shows the stop surface 28 as being a concave surface configuration. This configuration is not flat, but is formed with the axis X (FIG. 6) such that the torch tip received by the receiving and mounting surface 22 will be held substantially at the desired angular relationship.

To further the desired angular orientation of the torch tip, the receiving and mounting surface 22 preferably includes a bore 23 that is most preferably coaxial or dictates a substantial coaxial relationship with the torch tip T when mounted thereto. The concave stop surface configuration thus functions with the bore 23 to substantially center and assist in angular orientation of the torch tip by engagement with bottom surfaces of the torch tip mounting nut N, while the bore 23 also aids to angularly orient the tip.

Figure 7:
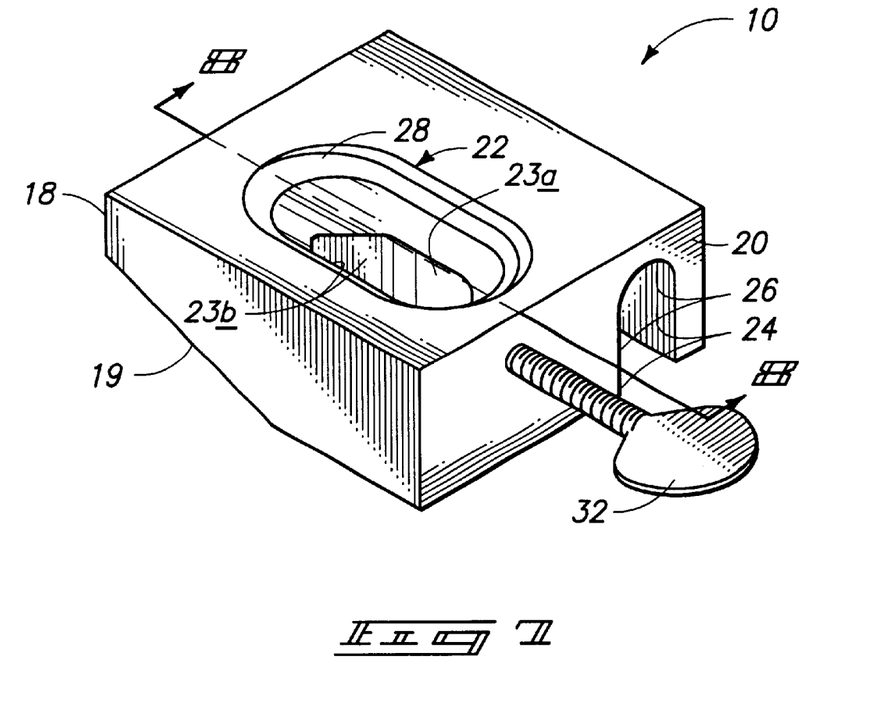
FIG. 7 is a perspective view of the cutting torch guide in a form intended for substantial universal use with various different forms of cutting torch tips.
Figure 8:
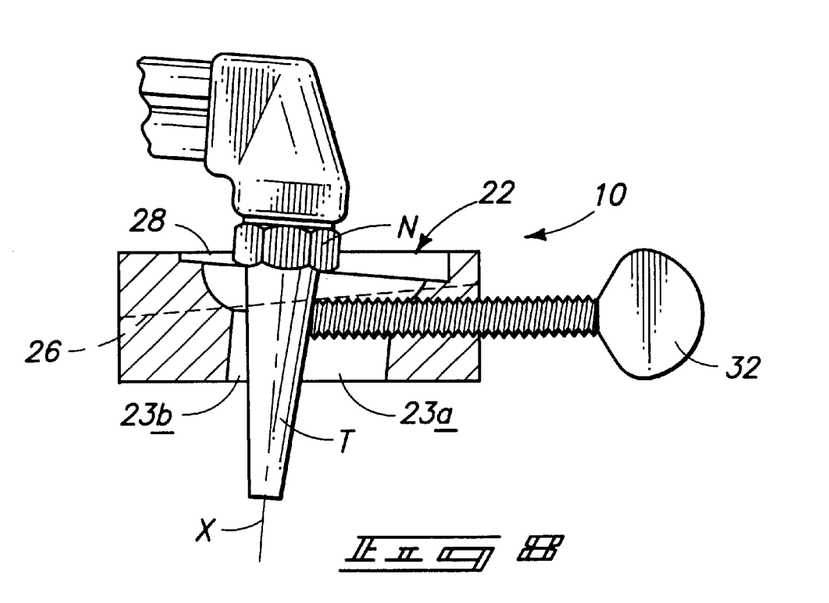
FIG. 8 is a sectional view of the guide, taken substantially along line 8—8 in FIG. 7.

FIGS. 7 and 8 illustrate another configuration of the torch tip receiving and mounting surface 22. In this instance, an elongated stop surface 28 is provided, along with a similarly elongated slot 23A. Converging centering surfaces 23B may be provided at a leading end of the slot 23A to engage and center a received torch tip T. The illustrated configuration of the slot embodiment shown in FIGS. 7 and 8 is intended to facilitate mounting cutting torch tips having different sizes, yet with the received tip being held at a desired angular relationship with the angle iron edge receiving and guide surface 26.

It is preferable with the illustrated guide examples shown and described, that a clamp member 32 be provided to releasably secure the torch tip to the block 12. The clamp does not necessarily serve to orient the torch tip, but to simply secure the tip in position. Thus, the guide 10 can be temporarily, yet securely attached to the cutting torch.

The clamp member 32 is illustrated by way of example as a thumb screw threadably engaged within an appropriate hole formed in the block and leading into the bore 23. Preferably, the thumb screw axis intersects the torch tip axis X when the torch is mounted to the block.

It is pointed out that while a thumb screw clamp 32 is illustrated, that other forms of clamping arrangements could be used as well. Specially sized inserts, cam clamps, or other equivalent structures may be used to secure the guide to the torch. The thumb screw clamp is simply illustrated as one form of clamp that is simple and effective.

Referring now to the angle iron side receiving and guide surface 24, and the edge receiving and guide surface 26; reference will be made to FIG. 9 in particular, although other figures illustrate the named surfaces as well.

Surfaces 24 and 26 may be formed as suggested in the illustrations by a groove or slot that is formed through the block from the leading to the trailing ends 18, 20. It should be understood, however, that the slot configuration is shown by way of example and that other forms could be used.

For example, the surfaces 24 and 26 could be formed as an inverted "L" shaped recess (not shown) that could be milled or otherwise formed in the block 12. In such a configuration, the surface 26 would be open to the side, and only a single side engaging surface 24 would be provided.

However, the inverted "U" shaped slot is preferred to confine the guide along the engaged flange of the angle iron as shown in FIG. 9 so either one of the opposed side engaging surfaces 24 may be used to guide the torch along the guide plane G but with the torch tip spaced a prescribed distance from the angle iron.

It is pointed out that either one of the surfaces 24 may be used to slide or rub against an adjacent surface of the angle iron. The surfaces 24 are spaced apart by a distance sufficient to allow relatively free movement of the guide along the angle iron, but close enough to avoid or minimize lateral "play". The surfaces 24 are preferable formed in planes parallel to the axis X.

The edge receiving and engaging surface 26 is preferably angularly oriented as briefly discussed above in order to angle the torch in an angular relationship with the workpiece that is preferred for metal cutting operations. This angle may be best understood with reference to FIG. 1. The torch tip angle is preferably an acute angle Y with respect to the workpiece plane P. This angle is influenced by the angular orientation of the edge-receiving and guide surface 26, and the torch tip receiving and mounting surface 22 (particularly, the stop surface 28).

In preferred forms, the edge-receiving and guide surface 26 is formed at an angle A (FIG. 4) that is no greater than approximately 10° and more preferably in a range from 2°–9° from the plane of the bottom surface 16, and that is preferably opposite to the angle B of the stop surface 28 with respect to the bottom surface 16 of the block.

It is preferred that the two angles A and B be substantially equal and opposite, resulting in the angular orientation for the torch tip axis X at an acute angle Y with respect to the plane of the workpiece P, or with respect to the angle iron edge receiving and guide surface 26.

Figure 4:
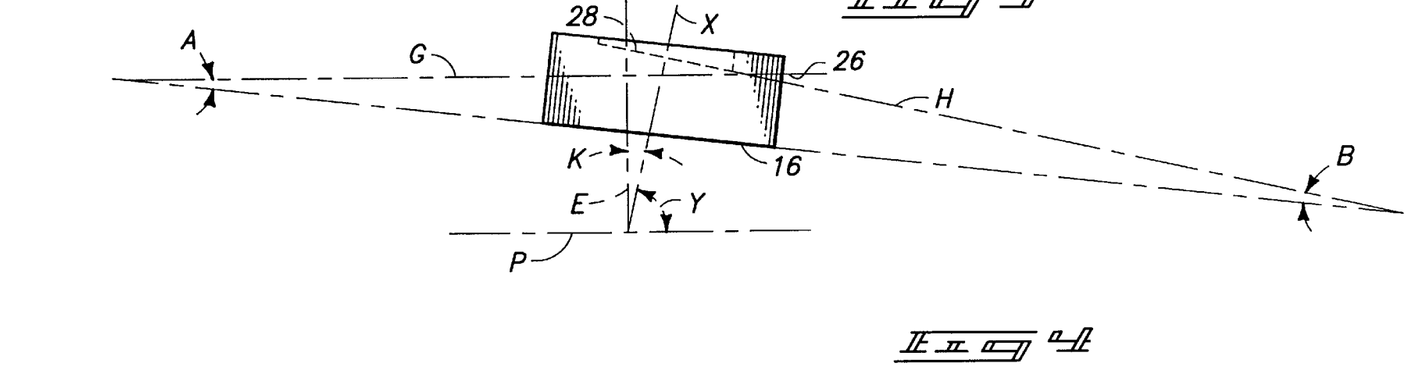
FIG. 4 is a graphic diagram of a block in side view illustrating preferred angles for guide and torch tip receiving surfaces.

FIG. 4 illustrates a line reference line E that is perpendicular to the surface 26 (and to the workpiece plane P). Surface 26 is typically held parallel to the plane P of the workpiece by reason of engagement with the top edge of the angle iron guide. It is preferred that the angle K between axis X and line E be within a range of between approximately 4° and 18°. This is the desired "tip" angle for the torch.

Said another way, the final angular orientation of a torch tip, when the guide 10 is mounted in position on an angle iron, is an acute angle formed between the torch tip axis X and a plane (represented by line E) that is substantially perpendicular to the edge receiving and guide surface 26. This angle K is equal to the sum of the angles between the bottom plane of the block and the surfaces 26, 28 (angle A plus angle B).

It is also preferred that the bore 23, surface 28 and surface 26 all be arranged according to particular torch tip lengths, so the flame tip F (FIG. 1) will be elevated approximately ⅛ inch from the workpiece plane P. Thus it may be that several different sized of guides 10 may be produced to accommodate several standard torch tip lengths.

Regardless of the nature or combination of the angular surfaces, it is preferred that the two surfaces be each angularly oriented to arrive at the ultimate objective of tipping the torch cutting tip at an angle preferred for preheating the workpiece during the cutting operation. It is also preferred that the surfaces be angularly oriented in order to slightly tip the bottom surface 16 of the block 12 upwardly (see FIG. 1) when the edge receiving and guide surface 26 is positioned on an angle iron guide. This upward tip or orientation serves to provide visual access to the workpiece area.

To further visual access, it is preferred to provide a cutaway surface 19 that may be formed along the forward end 18 at a location joining the bottom surface and spaced outwardly from the side and edge receiving and guide surfaces 24, 26. FIG. 1 shows the surface 19 as do FIGS. 5 and 6.

Given the above technical description, operation of the invention may now be easily understood. Firstly, the guide 10 will be provided in forms suited for particular cutting torch tips so the user may be instructed to select an appropriate guide for a particular size or brand of cutting torch tip. Once this task is complete, the user simply places the torch tip downwardly through the bore 23 until the tip nut N comes into abutment with the stop surface 28. The stop surface 28 (with the assistance from the bore 23) automatically angularly orients the torch tip and spaces the tip in relation to the side and edge receiving guide surfaces 24, 26. Once the nut N is in flush engagement with surface 28, the user may simply operate the clamp 32 to secure the guide to the torch tip. The unit is now ready for use.

Prior to use, the selected cutting line may be established using ordinary practices. However, as an additional step, an appropriate angle iron (in most cases a 1.5" by 0.25" angle iron) may be placed on the length of the selected cutting line. The guide may now be placed over the top edge of the angle iron and adjustments may be made to situate the torch tip just above the cutting line (preferable approximately ⅛ inch). The angle iron guide may now be clamped or otherwise secured to the work surface. The torch may next be ignited, adjusted, and the cut may begin in the usual manner, except that the guide is placed over the angle iron to determine the proper cutting line, the height of the cutting tip from the workpiece, and the angle of the cutting tip with respect to the direction of movement for the torch. The result is that the cut will be accurate with respect to the cutting line, and the cut surfaces will be smooth and relatively uncluttered with slag and spatter. The operator need only be aware of the necessary cutting speed since the remaining variables (tip angle, tip spacing, and cutting line) are previously fixed by provision of the guide 10 and placement of the angle iron.

It is noted that the guide embodiments illustrated are exemplary forms that may be used with different torch tips. The example illustrated in FIGS. 7 and 8 represent a somewhat universal guide configuration that will receive and orient torch tips of different size. This may be an option for those having numerous forms of torches and a desire to have a single guide that will function with any one of the several different forms of torches and tips. However, the other forms illustrated are of a more dedicated nature and can be used to consistently and reliably orient a cutting torch with respect to an angle iron guide surface, thereby significantly reducing the setup time and increasing predictability for the cut consistency.

Use of the guide in either form will allow for accurate cutting and less finish operations that are typically required when hand-held cutting operations are performed.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus forming a guide for use with a cutting torch and a reference piece having an upstanding flange thereon, the reference piece being mountable upon a workpiece being cut by the cutting torch, the apparatus comprising:

a guide piece having a top surface and a bottom surface in opposition to said top surface, said guide piece also having a leading end and a trailing end in opposition to said leading end;

a receiving slot formed upon said bottom surface and extending between the leading and trailing ends for receiving portions of the upstanding flange therein in a relationship allowing the guide piece to move along the reference piece yet restrained against transverse lateral movement;

a torch receiver formed through said guide piece between the top surface and bottom surface for receiving tip portions of the cutting torch therein, said torch receiver being spaced from said receiving slot;

a stop surface formed about the torch receiver against which the cutting torch abuts when inserted into the torch receiver, said stop surface being angled relative to the top surface of the guide piece to angle the cutting torch into a tip angle which is acute toward said trailing end;

said receiving slot being angled relative to the top surface to add additional acuteness to the tip angle of the cutting torch held in the torch receiver;

at least one torch clamp for controllably clamping the cutting torch in the torch receiver.

2. An apparatus according to claim 1 wherein the stop surface is recessed into the top surface.

3. An apparatus according to claim 1 wherein the stop surface is concave.

4. An apparatus according to claim 1 wherein the stop surface is elongated.

5. An apparatus according to claim 1 wherein the stop surface is elongated and the torch receiver is elongated.

6. An apparatus according to claim 1 wherein the stop surface is elongated and the torch receiver is elongated and has walls which are at least partially converging.

7. An apparatus according to claim 1 wherein the at least one torch clamp is a threaded piece.

8. An apparatus according to claim 1 wherein the at least one torch clamp is a threaded thumbscrew.

9. An apparatus according to claim 1 and further including a cutaway surface on the leading end of the guide piece which aids viewing of the cutting torch beneath the guide piece during operation.

10. An apparatus forming a guide for use with a cutting torch and a reference piece having an upstanding flange thereon, the reference piece being mountable upon a workpiece being cut by the cutting torch, the apparatus comprising:

a guide piece having a top surface and a bottom surface in opposition to said top surface, said guide piece also having a leading end and a trailing end in opposition to said leading end;

a receiving slot formed upon said bottom surface and extending between the leading and trailing ends for receiving portions of the upstanding flange therein in a relationship allowing the guide piece to move along the reference piece yet restrained against transverse lateral movement;

a torch receiver formed through said guide piece between the top surface and bottom surface for receiving tip portions of the cutting torch therein, said torch receiver being spaced from said receiving slot;

a stop surface formed about the torch receiver against which the cutting torch abuts when inserted into the torch receiver;

said stop surface and said receiving slot being oriented so as to collectively provide an acute tip angle toward said trailing end to a cutting torch held within the torch receiver;

at least one torch clamp for controllably clamping the cutting torch in the torch receiver.

11. An apparatus according to claim 10 wherein the stop surface is recessed into the top surface.

12. An apparatus according to claim 10 wherein the stop surface is concave.

13. An apparatus according to claim 10 wherein the stop surface is elongated.

14. An apparatus according to claim 10 wherein the stop surface is elongated and the torch receiver is elongated.

15. An apparatus according to claim 10 wherein the stop surface is elongated and the torch receiver is elongated and has walls which are at least partially converging.

16. An apparatus according to claim 10 wherein the at least one torch clamp is a threaded piece.

17. An apparatus according to claim 10 wherein the at least one torch clamp is a threaded thumbscrew.

18. An apparatus according to claim 10 and further including a cutaway surface on the leading end of the guide piece which aids viewing of the cutting torch beneath the guide piece during operation.

* * * * *